(12) United States Patent
Rocher

(10) Patent No.: US 6,490,998 B1
(45) Date of Patent: Dec. 10, 2002

(54) DEVICE FOR PLAYING BALL WITH A DOG

(76) Inventor: Norbert Rocher, 54 rue Didot, 75014 Paris (FR)

( * ) Notice: Subject to any disclaimer, the term of this patent is extended or adjusted under 35 U.S.C. 154(b) by 0 days.

(21) Appl. No.: 09/807,511
(22) PCT Filed: Oct. 14, 1999
(86) PCT No.: PCT/FR99/02493
§ 371 (c)(1),
(2), (4) Date: Apr. 16, 2001
(87) PCT Pub. No.: WO00/22920
PCT Pub. Date: Apr. 27, 2000

(30) Foreign Application Priority Data

Oct. 16, 1998 (FR) .............................................. 98 12992

(51) Int. Cl.⁷ .............................................. A01K 29/00
(52) U.S. Cl. ....................................... 119/707; 119/702
(58) Field of Search ................................. 119/707, 702, 119/708, 709, 710, 711

(56) References Cited

U.S. PATENT DOCUMENTS

| 4,321,888 A | * | 3/1982 | Topliffe ........................ 119/709 |
| 4,884,807 A | * | 12/1989 | Welch ........................... 119/707 |
| 5,207,420 A | * | 5/1993 | Crawford et al. ............ 119/707 |
| 5,265,559 A | * | 11/1993 | Borell ........................... 119/707 |
| 5,351,652 A | * | 10/1994 | Budman et al. .............. 119/711 |
| 5,961,406 A | * | 10/1999 | Hass ............................. 119/707 |

* cited by examiner

Primary Examiner—Charles T. Jordan
Assistant Examiner—Judith A. Nelson
(74) Attorney, Agent, or Firm—Young & Thompson

(57) ABSTRACT

The device includes at least one oblong gripping element located at the periphery of a ball with which it is in contact, either indirectly via a covering element enclosing the ball, or directly by extending its external casing, or inner bladder or an element interposed between the two latter elements. The device has an elastic articulation between the gripping element and the ball, permanently returning the gripping element in a radial position relative to the ball center.

23 Claims, 1 Drawing Sheet

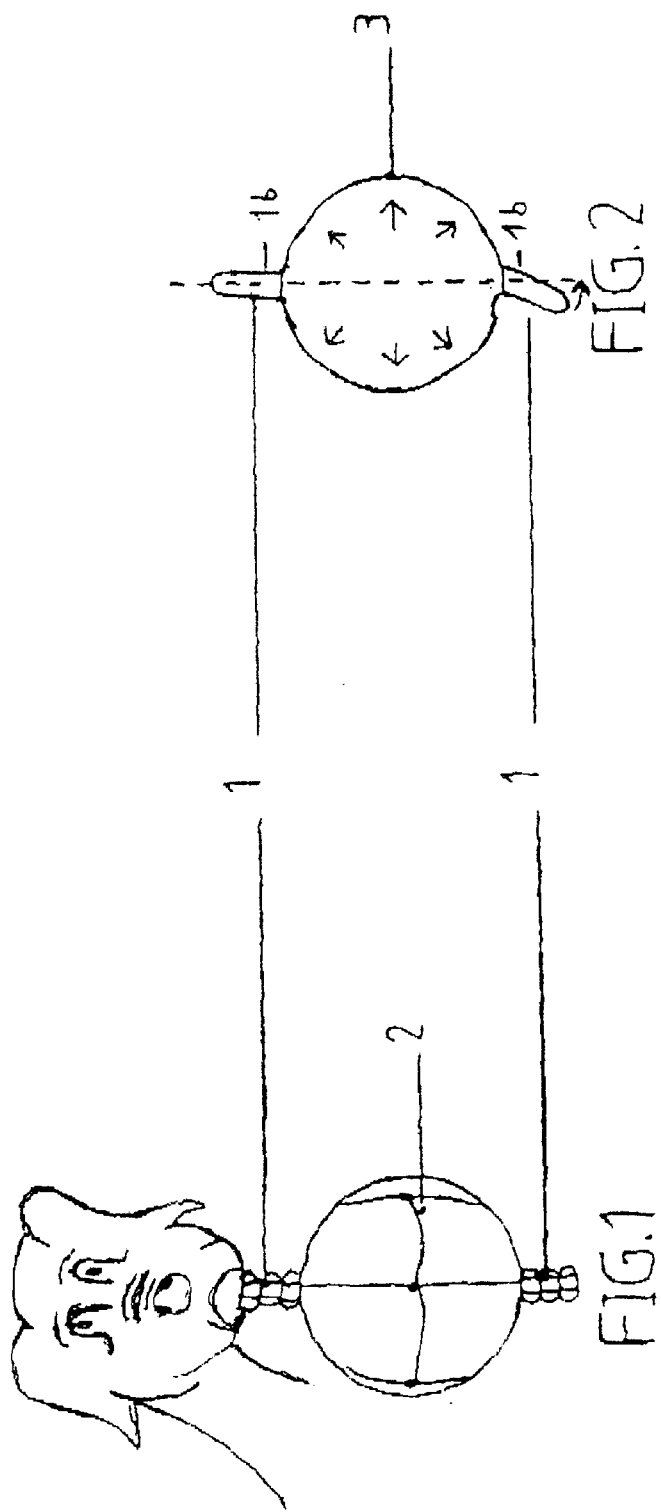
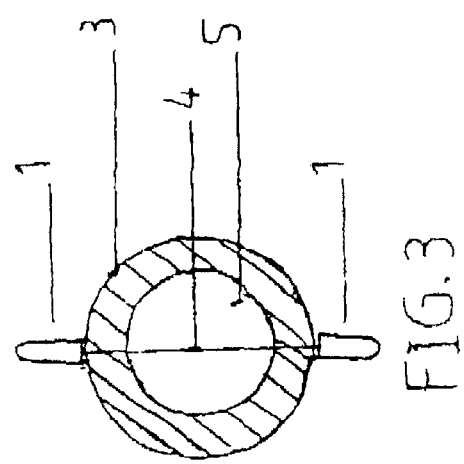

DEVICE FOR PLAYING BALL WITH A DOG

FIELD OF THE INVENTION

This invention relates to the field of items for dogs and in particular to a device making it possible to play ball with a dog using a ball or the like, as used in team sports, intended to be inflated with pressurized air, equipped with an automatic shut-off inflation valve or ball of the preinflated type, so that a dog can, among other things, bring it back in his mouth without puncturing it, of the type consisting of at least one grip, said grip being designed to be grasped in the mouth of the dog, said ball having at least a median circumference of a width of at least 90° of angular sector with respect to the center of the ball free of any grip protruding from this surface so as to allow the ball to roll in at least one direction.

BACKGROUND OF THE INVENTION

At the present time, there is no large ball in existence for dogs, even though it is far more fun to play ball with a dog using a large ball than using a small ball. Since none of the current large balls (footballs, handballs, basketballs, volleyballs, etc.) has any grip, the dog tries to grab them in its mouth in order to pick them up, and thus very soon punctures them. However, for the sport of horse ball there is a six handled net, through the meshes of which a deflated large ball is introduced to then be reinflated once inside. The six tall and broad leather handles completely surround the ball, preventing it from rolling or bouncing at all, as demanded by that sport, for convenience of the riders. These tall and broad handles, designed to be grasped by a human hand, prove entirely unsuitable and dangerous for hoisting the ball into the air by kicking it and for being gripped in the mouth of a dog. In addition, the fact that this ball does not roll or bounce at all removes the entire interest of playing ball with a dog. Certain large balls are sold in a net with two fine handles so that they can be more readily transported. As the handles are not arranged radially, they cannot be stood up, project, and protrude to a marked extent from the outer cover of the ball. Indeed they rather tend to lie flat against the outer cover of the large ball. As a result, the dog cannot grip them and therefore tries to grab the ball in its mouth in order to pick it up, and thus very soon punctures it. Furthermore, an American patent numbered U.S. Pat. No. 5,265,559 describes a toy for a dog consisting of a flexible grip tied to a grip in the shape of an arc of a circle which is itself attached to a portion of a large ball. As these two grips are not elongate, do not have a certain rigidity, do not have a.

SUMMARY OF THE INVENTION

This present invention provides a solution to these problems.

Its object is a device of the aforementioned type, characterized in that said grip has an oblong shape along a longitudinal axis, such as the shape of a cylinder, a cone, a bar, a.

rod or such that it resembles an object such as, for example, a bone or a sausage, and in that the part of said grip closest to the center of the ball is rigid or semi-rigid so that it can keep itself erect and in that said base of said grip defines, with the zone of said ball adjacent to this said base, an articulation such that, under the effect of a force exerted laterally on said base of the grip, the latter finds itself in a position such that the grip protrudes to a marked extent beyond the zone of the ball where it is located and projects, it therefore being readily accessible to the mouth of the dog, thus dissuading the dog from gripping the large ball directly by its outer cover as this would soon cause the ball to be punctured.

This device is characterized in that the base of the grip is securely and firmly connected to a full or perforated wrapping or enveloping element made of a strong material such as plastic, synthetic cord, natural cord, lashing, Kevlar (trade name), synthetic strapping, natural strapping, intended to be run right around a ball, closely following its shape, at least temporarily while the ball is being used with a dog, the elastic articulation with a position of equilibrium being between the wrapping element and the zone of the ball adjacent to the base of the grip by virtue of the elastic deformation of this zone of the ball. This device is characterized in that the wrapping or enveloping element is cording or strapping wrapped around a ball in such a way as to describe at least three circumferences, such as circles, located in at least three mutually different planes, secured together so as to trap the ball in a strong net, from which the ball can be extracted and reintroduced by deflating. This device is characterized in that the base of the grip passes through the wrapping or enveloping element so that part of the base of the grip is inserted Another subject of the invention is the use of such a device as a ball for playing with dogs.

BRIEF DESCRIPTION OF THE DRAWINGS

FIG. 1 depicts a large ball trapped in a strong net (2) to which are attached two opposed grips (1), one of which is being gripped in the mouth of a dog.

FIG. 2 depicts the central cross section through a large ball, the two elongate grips (1) of which are an extension of the outer cover (3) of the ball with which they have been molded. This figure also schematically depicts the elastic articulation between the base of the grip (1b) and the adjacent zone of the ball, which always repositions the grip (1) in a radial position of equilibrium.

FIG. 3 depicts the central cross section through the outer cover (3) of a large ball in which cover a strap (4) is fully wrapped around the internal bladder (5) of this ball. This strap (4) allows two sausage-shaped grips to be fixed to it, through two opposed openings made in the outer cover (3) of the ball.

DETAILED DESCRIPTION OF THE INVENTION

The device making it possible to play ball with a dog using a large ball consists of at least one grip (1), of at least one connecting element (2) (4), of the outer cover (3) and, for certain embodiments, of the inner bladder (5) of a ball.

Playing ball with a dog using a large ball is interesting only if you can shoot the ball and if the ball rolls and bounces adequately. This is why a large ball of a spherical type used in team sports, such as a football, a basketball, a volleyball or a handball is highly appropriate to this practice. The ball is of a spherical type as opposed to the oval balls used in particular in rugby and in American football. A spacehopper, on which a child sits to bounce along, is entirely unsuited to this practice because it is too bulky to be thrown and brought back by a dog, even a large dog. A large ball, the diameter of which is between 15 cm and 40 cm is entirely satisfactory. The outer cover (3) of the large ball, which cover is used to play with a dog, has to be inextensile, so as to rigidify the ball when the latter is inflated with air, thus discouraging the dog from gripping it in its mouth. In order to allow the ball to bounce, which is one of the attractions of this practice, the ball has to be inflated with pressurized air so as to allow this ball to bounce and roll correctly. As the internal air pressure has to be very high in order to rigidify the ball, this result is obtained using an automatic shutoff inflation valve or using a ball of the preinflated type. Beach balls, on the other hand, which are fitted with a valve for inflation by mouth, fitted with a cap, lack rigidity because the internal air pressure is insufficient. As a result, a dog may grasp such a ball in its mouth and very soon puncture it.

To discourage the dog from gripping the large ball via its outer cover (3), which would have the immediate consequence of puncturing it, the grip (1) has always to be readily accessible to the mouth of the dog. To do this, it is essential for the grip (1) to project erect, protruding to a marked extent beyond the zone of the ball at which it is located. To do this, the grip (1) has to be, at least as far as its base (1b) is concerned, that is to say at least as far as the part of the grip (1) closest to the outer cover (3) of the ball is concerned, always arranged along a radial axis with respect to the center of the ball. For this, at least the base of the grip (1b) has to be rigid to prevent it from curving, folding, or lying flat against the outer surface of the outer cover (3) of the ball. For this, the base of the grip (1b) has to be held securely, firmly and stably with respect to the ball to encourage it to remain in a radial position with respect to the center of the ball, resisting the external stresses exerted on it. However, the base of the grip (1b) which is rigid, arranged firmly and radially with respect to the center of the ball, slows the movement of this ball (negotiation of obstacles, forces of friction in the air, etc.). This is why the base of the grip (1b) needs to be articulated with respect to the ball so as to be able to bend, for example, when it strikes an obstacle, in the air to limit the friction forces, etc. However, the longitudinal axis of the base of the grip (1b) has systematically to reposition itself along a radial axis with respect to the center of the large ball as soon as the external stresses exerted on it cease so that the grip (1) is always readily accessible to the mouth of the dog. For this, the large ball, which is inflated with pressurized air, and more particularly the zone of this ball that is located near the grip (1), has properties of elastic deformation. By way of indication, this grip may be made of a length of rubber pipe, the base of which is made more rigid by introducing a screw into it. The entirety of the grip (1) may also be rigid. By way of indication, a rigid grip (1) may consist of the braiding of four strands of lashing braided together. Likewise, the grip (1) may be a hard plastic sausage. Conversely, a grip (1) consisting of fine cord, emerging through the outer cover (3) of a large ball through an orifice would deform under the action of gravity without standing up prominently and permanently above the outer surface of the outer cover (3) of the ball. Likewise, a grip (1) made of a chain would suffer the same result, as the links of this chain can move relative to one another.

In order for the ball to be able to roll in at least one direction, which is one of the benefits of this practice, no grip (1) must project beyond the outer surface of the outer cover (3) of the ball in a central circular zone 360° long by 90° wide.

The shape of the grip (1) must be elongate, for example representing a cylinder, a bone, a sausage or a cone. This grip of elongate shape is the best suited to being grasped in the mouth of a dog. What happens is that the grip (1) becomes wedged in the dog's mouth, sideways, behind its canines, between its premolars. The ball hangs down the side of the mouth of the dog (which gives the dog a clear view and keeps its muzzle unencumbered). This grip needs to measure approximately the width of the mouth of the dog, so that it can be wedged simultaneously by both the left-hand half and the right-hand half of the jaw. Under pulling forces, the grip (1) can merely slide sideways between the dog's teeth without damaging them. Conversely, a ring-shaped grip is dangerous to the dog's teeth. This is because since the ring passes behind the dog's incisors, pulling forces exerted on this grip tend to dislocate its teeth and its lower jaw. In addition, an elongate grip only very slightly impedes the rolling and bouncing of a ball. Indeed, the optimum embodiment of this device consists in placing two elongate grips at the periphery of a large ball, the grips being arranged so that they are diametrically opposed and in a radial axis with respect to the center of the ball, so that they can be likened to an axis of rotation. As a result, the ball is balanced as it moves, thus traveling in straight lines. Conversely, if the two grips were located one beside the other, as in the case of the spacehopper, or if there were just one grip, the large ball would be unbalanced and would travel in a curved path. As a result of this, the large ball does not travel very far, the person throwing the ball cannot reach a precise objective, the dog has difficulties in grasping the grip, as the latter contacts the ground. Further, an excessively long (longer than 10 cm) grip (1) would compromise the rolling and bouncing of the ball, without improving the ability of the dog to grip it in its mouth. For these same reasons, the base of the grip (1b) has to have a reduced and unique cross section. A handle-shaped grip, which therefore has a double cross section at its base, impedes the movement of the ball. The ideal grip (1) is a segment of a cylinder 8 to 10 cm long and 2 cm in diameter. On the other hand, a grip in the shape of a pyramid 3 cm tall and with a square base (the part of the grip closest to the outer surface of the outer cover of the ball) with sides measuring 5 cm has nothing to recommend it. Likewise, as the ball is as likely to be thrown by hand and kicked away by the foot, a grip in the form of a handle in which a foot could catch is not to be adopted. The grip (1) has to be big enough to allow it to be grasped firmly in the mouth of a dog, but not too big in order for it not to impede the movements of the ball, made of a material which does not have an adverse influence on the dog's teeth and which can withstand the fangs of the dog. By way of indication, two pieces of large-diameter (8 mm) lashing about 40 cm long can be braided together to form a roughly cylindrical grip (1), the end of which is melted by heating to prevent any unraveling. Just two grips (1), located in opposition at the periphery of a large ball, are sufficient for being swiftly grasped by a dog, only very slightly impeding the mobility of the ball.

The base of the grip (1b) may be connected, either to a full or perforated wrapping or enveloping element (2) placed around the large ball or to an internal element (4) inserted between the outer cover (3) and the inner bladder (5) of the ball, or to the outer cover (3) and/or the inner bladder (5) of a ball. The wrapping or enveloping element (2), which experiences significant tensile forces and attempts at tearing it from the fangs of the dog, needs to be strong. This is why current nets used to hang balls up in shops cannot be used, because they would very quickly become torn. In addition, these nets do not fully follow the spherical shape of the ball, and the latter rolls and bounces with difficulty. As the wrapping or enveloping element (2) fully or partially envelopes the ball, the latter therefore finds itself trapped in this envelope from which the ball can be extracted either by deflating or through an opening mechanism provided in this envelope. It may, for example, be a bag in the shape of the ball and equipped with a zip-fastening opening mechanism, a laced opening, an opening with a buckle, buttons, etc., and to the surface of which at least one sausage-shaped grip (1) is attached. It is preferable for the wrapping or enveloping element (2) to be very reduced in nature so that it does not make the ball much heavier if wet. The wrapping element (2) may be a tie. This tie, the shape (rounded, flattened, etc.), natural material (cotton, leather, etc.) or synthetic material (nylon (trade name), KEVLAR (high strength aramid), etc), the construction (braided or otherwise), the dimensions (cross section preferably in excess of 0.5 mm²) and color of which may vary, may, in particular, be a lashing, some nylon (trade name) fishing line or a KEVLAR (high strength aramid) filament. By way of indication, a lashing 3 mm in diameter can be wound around a large ball in three circles located in three mutually perpendicular planes, joined together by knots, to certain intersections of which a grip (1) is attached.

The internal element (4) inserted between the outer cover (3) and the inner bladder (5) of the ball may be a strap. By way of indication, a very thin and narrow (20 mm wide) strap is introduced into a large ball and wrapped around its internal bladder (5) so that its two ends re-emerge together through one and the same opening in the outer cover (3) of the ball, while a double thickness of this strap emerges through another opening opposite the first.

The base of the grip (1) may be connected directly to the outer cover (3) of a ball. The material (leather, plastic, etc.), the dimensions (thickness and diameter) and the color of this cover may vary. By way of indication, two grips (1) may be stitched to the leather outer cover (3) of a ball.

The grip (1) is either an extension of the connecting means or attached to the latter. In the former instance, the grip (1) may be molded with the outer cover (3) of the ball. It may also be a continuation of the ties surrounding the ball, of the internal element (4) inserted between the outer cover (3) and the inner bladder (5) of the ball. By way of indication, two long lashings are braided together to form a first grip (1). They then pass around a ball to form a strong net (2). Finally, they are braided together again to form a second grip (1). In the latter instance, the base of the grip (1b) may be connected to the wrapping or enveloping element (2) or to the internal element (4) inserted between the outer cover (3) and the inner bladder (5) of a ball by a strong knot, by stitching, by bonding, etc. The base of the grip (1b) may be fixed to the outer cover (3) of the ball by screwing, insetting, etc. By way of indication, the grip (1) may be screwed onto a wide-head plastic screw emerging through the outer cover (3) of a ball. By way of indication, a screw, the flat head of which is inserted between the outer cover (3) and a wrapping element (2), passes through the wrapping element (2) to fasten into the base of a grip (1b). By way of indication, two metal wires may cross under the intersection of two meshes of a net arranged around a ball, to reappear over this intersection before being fixed into a plastic sausage. In this example, the base of the grip (1b) is arranged around part of the wrapping element (2) unlike the previous example in which the base of the grip (1b) passed through the wrapping element (2). When the base of the grip (1b) is connected to a zone of the outer cover (3) of the ball, when it is displaced off-line by an external stress, the base of the grip (1b) exerts added pressure on the side toward which it leans, and reduced pressure on the opposite side. The internal air pressure of the ball resists this deformation and as soon as the external stress ceases, repositions the axis of the base of the grip (1b) along an axis which is radial with respect to the center of the ball.

This device allows a dog to fetch a ball without puncturing it, and also allows several dogs to play together pulling the ball along by each of its grips.

This invention is likely to be of interest to the manufacturers of items for dogs.

What is claimed is:

1. A device for playing ball with a dog using a ball, as used in team sports, intended to be inflated with pressurized air, equipped with an automatic shut-off inflation valve or a preinflated ball, so that a dog can bring the ball back in its mouth without puncturing the ball, the device consisting of at least one grip, said grip being designed to be grasped in the mouth of the dog, said ball having at least a median circumference of a width of at least 90° of angular sector with respect to the center of the ball free of any grip protruding from the surface so as to allow the ball to roll in at least one direction, wherein said grip has an oblong shape along a longitudinal axis, and the part of said grip closest to the center of the ball is rigid or semi-rigid so that the grip can keep erect and said base of said grip defines, with the zone of said ball adjacent to said base, an articulation such that, under the effect of a force exerted laterally on said base of the grip, the grip protrudes to a-marked extent beyond the zone of the ball where the grip is located and projects, the grip therefore being readily accessible to the mouth of the dog, thus dissuading the dog from gripping the ball directly by an outer cover of the ball which would soon cause the ball to be punctured.

2. The device according to claim 1, wherein the articulation of said base of the grip is an elastic articulation so that when a force has been exerted laterally on said base of the grip, the grip returns to a position of equilibrium.

3. The device according to claim 2, wherein, in the position of equilibrium, the longitudinal axis of the base of the grip passes more or less through the center of said ball.

4. The device according to claim 1, wherein the base of the grip is securely and firmly connected to a full or perforated wrapping or enveloping element made of a strong material intended to be run right around a ball, closely following the shape of the ball, at least temporarily while the ball is being used with a dog, the elastic articulation with a position of equilibrium being between the wrapping element and the zone of the ball adjacent to the base of the grip by virtue of the elastic deformation of the zone of the ball.

5. The device according to claim 4, wherein the wrapping or enveloping element is cording or strapping wrapped around a ball in such a way as to describe at least three circumferences located in at least three mutually different planes, secured together sb as to trap the ball in a strong net, from which the ball can be extracted and reintroduced by deflating.

6. The device according to claim 4, wherein the base of the grip passes through the wrapping or enveloping element so that part of the base of the grip is inserted between the wrapping or enveloping element and the outer cover of the ball.

7. The device according to claim 4, wherein the base of the grip is arranged around a part of the wrapping or enveloping element so that part of the base of the grip is inserted between the wrapping or enveloping element and the outer cover of the ball.

8. The device according to claim 1, wherein the base of the grip is securely and firmly connected directly to a zone of the outer cover of a ball by making the grip as one and the same piece of molded plastic, the elastic articulation with a position of equilibrium being between the base of the grip and the zone of the ball adjacent to the base of the grip by virtue of the elastic deformation of the zone of the ball.

9. The device according to claim 1, wherein the base of the grip is securely and firmly connected to an inserted internal element between an internal bladder and the outer cover of a ball, the outer cover of the ball has at least one opening so as to allow the connection between the inserted internal element and the base of the grip, the elastic articulation with a position of equilibrium being between the inserted internal element and the zone of the ball adjacent to the inserted internal element by virtue of the elastic deformation of the zone of the ball.

10. the device according to claim 1, wherein the base of the grip is securely and firmly connected to a zone of an internal bladder of a ball, the outer cover of the ball has at least one opening so as to allow the connection between the internal bladder and the base of the grip, the elastic articulation with a position of equilibrium being between the base of the grip and the zone of the ball adjacent to the base of the grip by virtue of the elastic deformation of the zone of the ball.

11. The device according to claim 1, wherein the base of the grip is attached to the element to which the grip is connected.

12. The device according to claim 1, wherein the base of the grip is an extension of the element to which the grip is connected.

13. The device according to claim 1, wherein the grip is made from at least one element selected from the group consisting of plastic, rubber, cord, and textile, to give the grip good strength without injuring the mouth of a dog.

14. The device according to claim 1, wherein the grips, when there are at least two grips, are arranged with respect to the ball so that the grips are diametrically opposed so as not to unbalance the ball as the ball moves, so that the ball can travel in a straight line.

15. The device according to claim 1, wherein the entirety of the grip is rigid.

16. The device according to claim 5, wherein the grip is a hard plastic sausage connected to the wrapping element by at least one metal fastener.

17. The device according to claim 1, wherein the ball is of spherical shape.

18. The device according to claim 17, wherein the ball has a diameter of between 15 and 40 cm.

19. Use of a device according to claim 1, as a ball for playing with dogs.

20. The device according to claim 1, wherein said grip has a shape selected from the group consisting of a cylinder, a cone, a bar, a rod, a bone and a sausage.

21. The device according to claim 4, wherein said wrapping or enveloping element is made of a material selected from the group consisting of plastic, synthetic cord, natural cord, lashing, high strength aramid; synthetic strapping and natural strapping.

22. The device according to claim 5, wherein said at least three circumferences are circles.

23. The device according to claim 9, wherein said inserted internal element is a block, a strip or the head of a screw.

* * * * *